A. B. LANDIS.
CHANGE SPEED GEARING.
APPLICATION FILED OCT. 28, 1907.
1,015,031.
Patented Jan. 16, 1912.
3 SHEETS—SHEET 1.
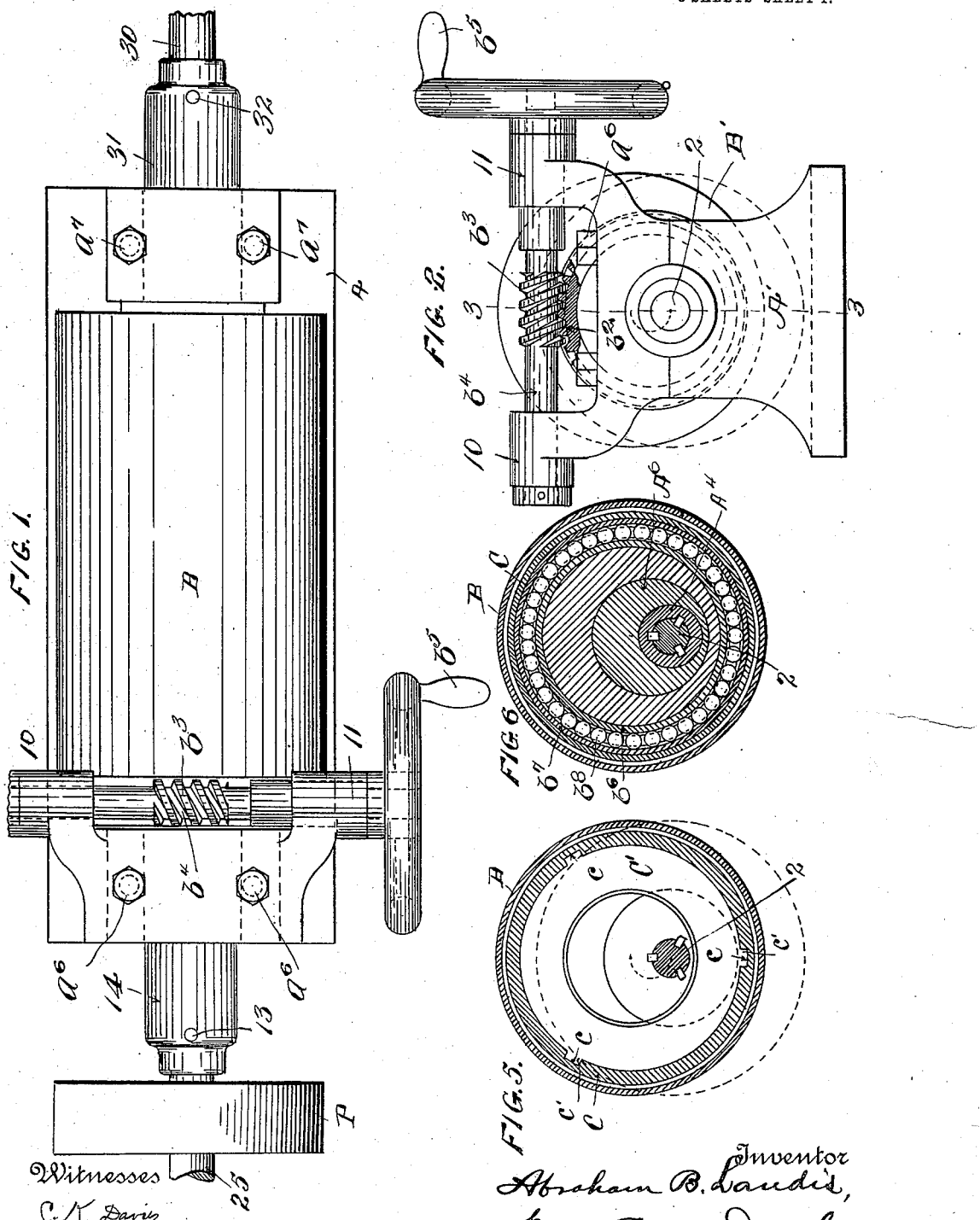

A. B. LANDIS.
CHANGE SPEED GEARING.
APPLICATION FILED OCT. 28, 1907.

1,015,031.

Patented Jan. 16, 1912.

3 SHEETS—SHEET 2.

Witnesses
Inventor
Abraham B. Landis,
Attorney

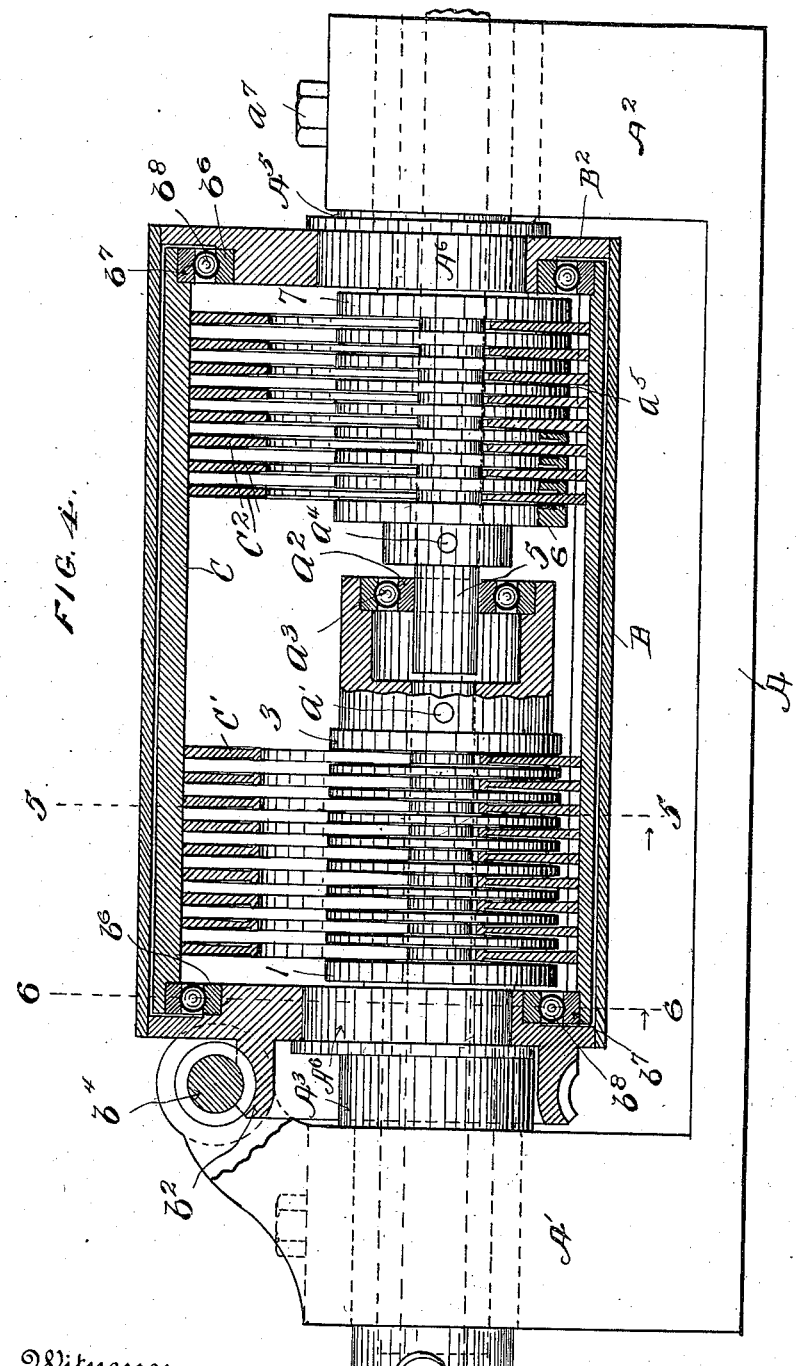

UNITED STATES PATENT OFFICE.

ABRAHAM B. LANDIS, OF WAYNESBORO, PENNSYLVANIA.

CHANGE-SPEED GEARING.

1,015,031.  Specification of Letters Patent.  Patented Jan. 16, 1912.

Application filed October 28, 1907. Serial No. 399,447.

*To all whom it may concern:*

Be it known that I, ABRAHAM B. LANDIS, a citizen of the United States, residing at Waynesboro, in the county of Franklin and State of Pennsylvania, have invented certain new and useful Improvements in Change-Speed Gearing, of which the following is a specification.

In variable speed frictional driving gearing of common construction the power is transmitted by contact between parts having only one to two points of contact, as where two faces bear one against the other or two parts bear on opposite sides of an intermediate part, thus affording only a limited contact surface between the driving and the driven part and requiring high speed and great pressure between the surfaces in order to transmit the required power. Such pressure and speed have a tendency to wear the mechanism rapidly and subject it to great strain, which makes the life of such gearing comparatively short and its use expensive because of the continual repairs and renewal of parts required.

The object of my said invention is, therefore, to provide a change speed frictional gearing by which the motion is transmitted by contact between a multiplicity of frictional surfaces which can be indefinitely multiplied according to the power or speed required, whereby great power may be transmitted with a comparatively light pressure between the parts and the wear and strain upon said parts thus reduced to a minimum and a gearing provided which will be very durable in use and comparatively inexpensive to maintain; also wherein the change in speed can be adjusted gradually and continually without any jar or undue strain upon the different parts; also which may be applied to shafts in line, obviating the necessity of auxiliary parallel shafts, whereby the device may be constructed in a very compact form; and also wherein the pressure of the frictional contact between the parts will be automatically regulated by the load upon said parts, all as will be hereinafter more fully described and claimed.

Figure 3:
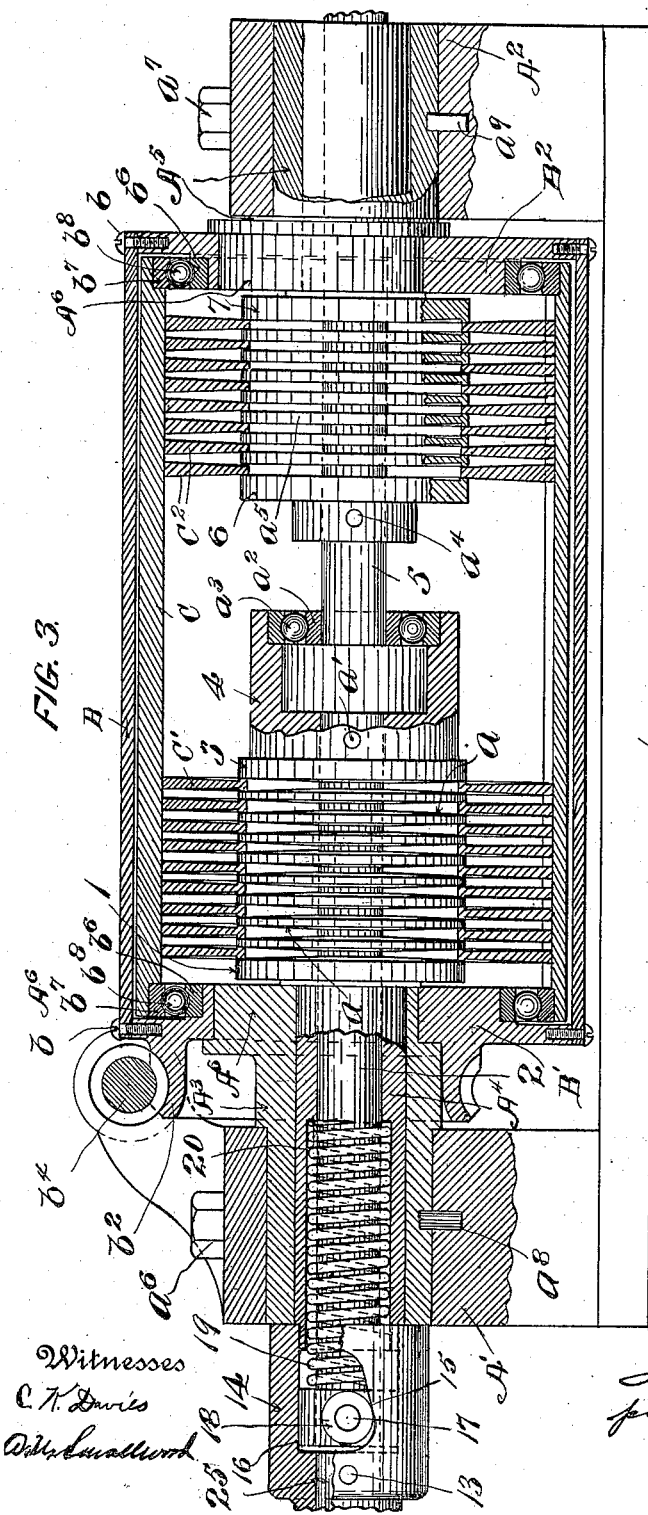
Figure 7:
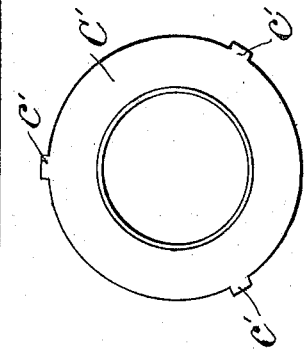

Referring to the accompanying drawings which are made a part hereof and on which similar reference characters indicate similar parts, Figure 1 is a top or plan view of a change speed gearing embodying my said invention, the gearing being contained within the casing, as when ready for use, Fig. 2, an end elevation of the same, Fig. 3 a longitudinal vertical section on the dotted line 3—3 in Fig. 2 with the parts in concentric position, as indicated by dotted lines in said figure, Fig. 4 a similar view with the driving and the driven parts in eccentric positions, as shown by whole lines in Fig. 2, Fig. 5 a cross section on the dotted line 5—5 in Fig. 4, Fig. 6 a cross section on the dotted line 6—6 in Fig. 4, and Fig. 7 a detail view of one of the outer disks separately.

In said drawings the portions marked A represent the bed of the machine, B the outside cylinder inclosing the gearing, and C the inside cylinder.

The frame or bed A is any suitable supporting part for the purpose, as shown, being provided with upright end pieces $A'$ and $A^2$ in which may be mounted the bearings for the shafts of the gearing. In the upright $A'$ is mounted a bearing consisting of a sleeve $A^3$. Within said sleeve $A^3$ is mounted the elongated hub $A^4$ of a disk 1, which is mounted upon a shaft 2 which shaft is journaled within said hub. Alongside and adjacent to said disk 1 is mounted a series of disks $a$ which may be of any number required for the purpose. The end disk 1 has a shoulder in its hub which bears against the inner end of sleeve $A^3$. At the opposite end of the series of disks $a$ is another end disk 3, which is secured rigidly to the shaft 2 by means of a transverse pin $a'$. Said disk 3 has a hub 4 carrying in its outer end a bearing ring $a^2$ for the end of a shaft 5, which is journaled at the opposite end of frame in an upright $A^2$ in the same manner as shown and described for shaft 2. Said bearing ring $a^2$ is preferably in two parts formed with a ball race in their adjacent faces with balls $a^3$ therein, thus making a ball-bearing of said part and avoiding the necessity of lubrication. On shaft 5 adjacent to the disk 3 is mounted a disk 6 which is rigidly secured to said shaft 5 by means of a transverse pin $a^4$ extending through the hub of said disk and said shaft, as shown. A series of disks $a^5$ are mounted adjacent to the disk 6 and at the end of said series is another end disk 7 having an elongated hub, corresponding in form to the hub $A^4$ of the disk 1, which is mounted within a sleeve $A^5$, which sleeve is mounted in the upright $A^2$. Said sleeve $A^5$ corresponds in form and construction substantially to the sleeve $A^3$ and each is secured rigidly in its upright by means of the clamping bolts $a^6$ and $a^7$ and the dowel-pins $a^8$ and $a^9$ respectively. On the inner end of each of the sleeves $A^3$ and $A^5$ is formed a head $A^6$ which is circular and formed eccentric to the axis of the shafts 2 and 5. On said heads are mounted eccentrically bored rings $B'$ and $B^2$, respectively, adapted to rotate thereon. Said rings $B'$ and $B^2$ are connected by the cylinder B which is rigidly secured to each by means of screws $b$, as shown most clearly in Fig. 3, thus securing said rings $B'$ and $B^2$ to said cylinder B to form a unitary structure. On the ring $B'$ is formed an annular flange $b^2$ in the outer surface of which is formed a worm gear with which a worm $b^3$ on a transverse crank-shaft $b^4$ is adapted to engage. Said crank-shaft $b^4$ is journaled in suitable bearings 10 and 11 on the top of standard $A'$ and is provided with a crank $b^5$ by which it may be turned. On the inner face of each of said rings $B'$ and $B^2$ is formed a circular flange on which is mounted a steel ring $b^6$ forming one-half of a ball-race. Each flange is also formed so that its ball-race is eccentric to the axis of the shaft.

The cylinder C is formed at its ends with recesses in which are mounted steel rings $b^7$ forming the other half of the ball-races and balls $b^8$ are mounted in said ball-races consisting of the rings $b^6$ and $b^7$, thus providing that said cylinder C will rotate freely on said ball-races and be carried on the rings $B'$ and $B^2$ which form the ends of the cylinder B and are mounted on the eccentric heads $A^6$ formed on the adjacent ends of the sleeves $A^3$ and $A^5$. The interior of the cylinder C is formed with three longitudinal grooves $c$, as shown most plainly in Fig. 5, and a series of disks $C'$ formed with radially projecting ears $c'$ are mounted in said cylinder with said ears fitting in said grooves, whereby said disks are permitted to slide longitudinally within said cylinder while they are held from independent rotation therein. Said disks are formed on their inner edges with projecting flanges, or thickened portions, which afford narrow bearing faces adapted to engage between the adjacent faces of the series of disks consisting of the disk 1, the several disks $a$ and the disk 3, which are formed with correspondingly tapered faces, as shown. At the opposite end of cylinder B disks $C^2$ are similarly mounted to engage between the adjacent faces of the series of disks consisting of the disk 6, disks $a^5$ and the disk 7, except at this end of the gearing the disks $C^2$ are tapered and the disks 6, $a^5$ and 7 have the narrow bearing rims, as shown.

A shaft 25 provided with a driving pulley P, or connected to the driving power in any desired manner, is provided with a thimble 14 on its inner end secured rigidly thereto by a pin 13, and said thimble fits over the outer end of hub $A^4$ which projects for a short distance outside of the standard $A'$. Said thimble also surrounds the outer end of shaft 2 and is coupled thereto by means of slots formed with tapered or cam edges 15 formed in its opposite sides with which rollers 18 on radially extending studs 17 engage. Said studs are mounted in opposite sides of a collar 16 rigidly secured on, or formed in piece with, the end of shaft 2. The slots in the sides of the thimble being widest at their outer ends the angle of their edges 15 will tend, through the connection described, to draw shaft 2 outwardly when the power is applied and to draw disk 3 toward disk 1 and close the series to clamp against the rims of series of disks $C'$ between them, and this clamping force will be automatically increased or decreased as the load or power increases or diminishes, as will be readily seen. A spring 19 is interposed between collar 16 and a shoulder 20 near the inner end of hub $A^4$ to normally hold the disks toward each other when the power is not on. Shaft 5 is coupled to an extension shaft 30 at the opposite end by a thimble 31, secured thereto by a pin 32, in the same manner. The shaft 2, therefore, becomes the driving shaft and the shaft 5 the driven shaft, although the motion can be reversed if desired, when the variations in the speed of the driven part would also be the reverse. In the connection provided between the adjacent ends of shafts 2 and 5 formed by the bearing ring $a^2$ the lateral strain upon one shaft at this end is thrown against the lateral strain upon the other, so that this connection serves as a steady rest for the respective inner ends of said shafts.

In operation, the parts being in the position shown in Fig. 3 and the power being applied to shaft 25, the rotation of said shaft and its operating through the thimble 14 cam-shaped edges 15 of the slots upon the rollers 18 on the end of shaft 2 will tend to draw said shaft outward and clamp the engaging faces of the disks $a$ and the disks $C'$ together, thus operating through said contact to drive the cylinder C and through said cylinder the disks $C^2$, and through said disks $C^2$, the disks $a^5$ and the shaft 5, from which the motion may be transmitted to shaft 30 and to the work. When it is desired to vary the speed, the crank-shaft $b^4$ is turned which, through the worm-gear connection with flange $b^2$ operates to turn the eccentric rings $B'$ and $B^2$ and the cylinder B secured thereto and the cylinder C carried on the bearings on said rings, around the eccentric heads $A^6$ and move the disks $C'$ and $C^2$ toward or away from the axis of the shafts and thus increase or diminish the speed transmitted to the cylinder C and through said cylinder C to the other end of the device. The connection between shaft 30, thimble 31 and shaft 5 being the same as shown between shaft 25 and shaft 2 it will be seen that the load on shaft 30 will operate to clamp disks 6, $a^5$ and 7 upon disks $C^2$ in the same manner as the power on shaft 25 operates to clamp disks 1, $a$ and 3 to disks $C'$.

Having thus fully described my said invention, what I claim as new and desire to secure by Letters Patent is;

1. In a change speed gearing, the combination, of a driving and a driven shaft arranged substantially in alinement with each other, a plurality of disks on each of said shafts mounted to move longitudinally, a parallel revoluble part, and a plurality of disks carried by said parallel revoluble part, a series of which are adapted to engage with the disks upon the driving shaft and another series of which are adapted to engage with the disks on the driven shaft, substantially as set forth.

2. In a change speed gearing, the combination, of the driving shaft, a series of longitudinally slidable disks locked against circumferential movement thereon, a driven shaft mounted substantially in line with said driving shaft, a series of longitudinally slidable disks locked against circumferential movement thereon, a rotary part parallel with said shafts, a series of disks on said rotary part adapted to engage with the disks on the driving shaft, and another series of disks on said rotary part adapted to engage with the disks on the driven shaft, substantially as set forth.

3. In a change speed gearing, the combination, of a driving shaft, a series of disks mounted thereon, a driven shaft journaled substantially in line with said driving shaft, a series of disks on said driven shaft, a cylinder mounted to rotate on suitable bearings around said shafts, a series of disks mounted in the interior of said cylinder and arranged to engage with the disks on said driving shaft, and another series of disks in said cylinder arranged to engage with the series of disks on said driven shaft, whereby motion may be transmitted from said driving shaft to said driven shaft, substantially as set forth.

4. In a change speed gearing, the combination, of the driving shaft, a series of disks slidably mounted on said shaft, the driven shaft mounted substantially in line with said driving shaft, a series of disks slidably mounted on said driven shaft, a cylinder mounted on suitable bearings to revolve around said shafts, a series of disks carried in the interior of said cylinder and mounted to slide longitudinally thereof and arranged to engage between the disks of said driving shaft, another series of disks similarly mounted within said cylinder and arranged to engage between the disks on the driven shaft, one series of disks in each set being formed with tapered faces and the other series which engages with the tapered faces being formed with narrow engaging edges, substantially as set forth.

5. In a change speed gearing, the combination, of the driving shaft, a series of disks mounted on said driving shaft, a driven shaft, a series of disks mounted on said driven shaft, a cylinder mounted to rotate on suitable bearings surrounding said shafts, two sets of disks mounted in said cylinder, one to engage with the disks on the driving shaft, and the other to engage with the disks on the driven shaft, bearings for said cylinder mounted on circular bearings eccentric to the axis of said shafts, and means for rotating said part on said eccentric bearings, whereby the points of engagement between the faces of the disks on the shafts and the disks carried by the cylinder may be moved toward and from the axis of said shafts, substantially as set forth.

6. In a change speed gearing, the combination, of the driving shaft, a series of disks mounted on said driving shaft, the disk on the inner end of said shaft being fast thereto and the other disks slidably mounted, means for normally holding said disks toward each other, a driven shaft mounted substantially in line with said driving shaft, a series of disks similarly mounted thereon, a rotary cylinder mounted on suitable bearings surrounding said shaft, said bearings, a series of disks secured by engagement with longitudinal grooves in the interior of said cylinder to slide therein and adapted to engage between the disks on said driving shaft, and another series of disks similarly mounted within the other end of said cylinder and adapted to engage with the disks on said driven shaft, substantially as set forth.

7. In a change speed gearing, the combination, of a driving shaft, a disk mounted on said driving shaft, the hub of the disk forming a bearing in which the driving shaft is journaled, a suitable support, a sleeve secured rigidly in said support, said hub of the disk being journaled in said sleeve, an eccentric head with a suitable bearing on its periphery being formed on the inner end of said sleeve, a ring mounted on said head and formed with a circular bearing, a cylinder mounted to rotate on said bearing, a series of disks carried in the interior of said cylinder, and a series of disks mounted on said driving shaft to engage with said disks carried by said cylinder, substantially as set forth.

8. In a change speed gearing, the combination, of a driving shaft, a disk mounted on said driving shaft, the hub of the disk forming a bearing in which the driving shaft is journaled, a suitable support, a sleeve secured rigidly in said support, said hub of the disk being journaled in said sleeve, a series of disks slidably mounted on said shaft adjacent to said disk, the one at the inner end rigidly secured to said shaft, an eccentric head formed on the inner end of said sleeve, an eccentric ring mounted on said head, means for rotating said ring, a rotary bearing on the inner face of said ring, a cylinder mounted on said bearing, a series of disks carried within said cylinder to engage the disks on said driving shaft, a driven shaft similarly mounted and substantially in line with said driving shaft, a series of disks on said driven shaft, another eccentric head on a sleeve within which said driven shaft is journaled on which the other end of said cylinder is adapted to rotate, and another series of disks within the other end of said cylinder adapted to engage with the series of disks on said driven shaft, substantially as set forth.

9. In a change speed gearing, the combination, of the driving shaft suitably journaled, a driven shaft mounted substantially in line therewith, a series of friction disks on each of said shafts, an eccentric bearing around the axis of each of said shafts, a supporting ring mounted on each of said eccentric bearings, an outer cylinder rigidly secured to said rings, means for rotating the outer casing formed by said outer cylinder and rings, an inner cylinder mounted to rotate on said bearings, a series of disks in said cylinder adapted to engage with the disks on said driving shaft, and another series of disks in said cylinder adapted to engage with the disks on said driven shaft, substantially as set forth.

10. In a change speed gearing, the combination, of a driving shaft, a series of disks mounted on said shaft, eccentric bearings surrounding said shaft, a revoluble part mounted on said eccentric bearings, a series of disks carried by said revoluble part arranged to engage with the disks on the driving shaft, and means for adjusting said revoluble part on said eccentric bearings, substantially as set forth.

11. In a change speed gearing, the combination, of the driving shaft, a series of disks on said driving shaft, bearings surrounding said driving shaft and eccentric thereto, a part mounted on said bearings to rotate around said shaft, a series of disks in said revoluble part arranged to engage with the disks on said driving shaft, and means for adjusting radially said rotary part, substantially as set forth.

12. In a change speed gearing, the combination, of the driving shaft mounted to have a longitudinal movement in its bearings, a power connection coupled to said driving shaft by a cam-faced coupling, a series of disks mounted on said shaft the end disk of the series being fast on said shaft and the others adapted to slide thereon, a driven part parallel with said driving shaft, a series of disks therein engaging with the disks on said driving shaft, one series of disks being formed with tapered adjacent faces and the other series of disks with narrow engaging rims, and means for adjusting the driven disks toward and from the axis of the driving shaft, substantially as set forth.

13. In a change speed gearing, the combination, of the driving shaft mounted to have a longitudinal movement in its bearings, said bearings, the power connection coupled thereto by cam-faced couplings, a series of disks mounted thereon having tapered adjacent faces, the disk on the inner end of the series being secured fast to said shaft, a rotary part mounted on eccentric bearings around said driving shaft, a series of disks with narrow engaging rims mounted on said part and adapted to engage between the tapered faces of the disks on the driving shaft, and means for adjusting said rotary part on said eccentric bearings, substantially as set forth.

14. In a change speed gearing, the combination, of the driving shaft mounted to have a longitudinal movement in its bearings, said bearings, means for sliding said shaft longitudinally by the application of the power, a series of disks mounted on said driving shaft, the disk on the inner end being fast to said shaft and the others being adapted to slide thereon whereby the sliding of said shaft will draw said disks together, a rotary part mounted parallel with said driving shaft another series of sliding disks therein engaging between the faces of the disks on said driving shaft, and means for adjusting the driven part toward and from the axis of the driving shaft, substantially as set forth.

15. In a change speed gearing, the combination, of the driving shaft, a series of disks mounted to slide thereon and formed with tapered adjacent faces, a cylinder mounted on eccentric bearings surrounding said driving shaft, said bearings, a series of disks mounted therein engaging with the disks on said driving shaft, means for adjusting said cylinder on said bearings, another series of disks in said cylinder, a driven shaft substantially in line with said driving shaft, and a series of disks thereon engaging with the second series of disks in said cylinder, substantially as set forth.

16. In a change speed gearing, the combination, of a driving shaft mounted to slide longitudinally in its bearings, said bearings, a power connection coupled thereto by a cam-faced coupling, a driven shaft mounted substantially in line with said driving shaft, a power transmission shaft coupled thereto by a cam-faced coupling, a series of disks mounted on each of said shafts, the disk at the inner end of each series being fast to its respective shaft, and the others being mounted to slide thereon, a rotary part mounted parallel with said shafts, two series of disks carried by said rotary part, one series of which engages with the series on the driving shaft and the other series of which engages with the series on said driven shaft, and means for adjusting said rotary part toward and from the axis of said shafts, substantially as set forth.

17. In a change speed gearing, the combination, of a driving shaft mounted to slide in its bearings, said bearings, a driven shaft substantially in line therewith and also mounted to slide in its bearings, said bearings, means for coupling the driving power to said driving shaft comprising means for sliding said shaft, means coupled to said driven shaft for transmitting the power comprising means for sliding said driven shaft, a series of disks on each of said shafts one of which disks is fixed against longitudinal movement in one direction, a rotary part parallel with said shafts, two separate series of disks on said rotary part one series of which engages with the series on the driving shaft and the other series with the series on the driven shaft, and means for adjusting said rotary part toward and from the axis of said shafts, substantially as set forth.

18. In a change speed gearing, the combination, of the driving shaft, a series of disks mounted on said driving shaft, a driven shaft, a series of disks on said driven shaft, means for transmitting the motion from the driving shaft to said driven shaft, and means for regulating the force of the engagement by the power and the load, substantially as set forth.

In witness whereof, I have hereunto set my hand and seal at Washington, D. C. this 18th day of October, A. D. nineteen hundred and seven.

ABRAHAM B. LANDIS. [L. S.]

Witnesses:
  E. W. BRADFORD,
  A. M. SMALLWOOD.

---

Copies of this patent may be obtained for five cents each, by addressing the "Commissioner of Patents, Washington, D. C."